United States Patent [19]

Maeda

[11] Patent Number: 4,621,318
[45] Date of Patent: Nov. 4, 1986

[54] MULTIPROCESSOR SYSTEM HAVING MUTUAL EXCLUSION CONTROL FUNCTION

[75] Inventor: Akira Maeda, Yokohama, Japan

[73] Assignee: Tokyo Shibaura Denki Kabushiki Kaisha, Kawasaki, Japan

[21] Appl. No.: 462,715

[22] Filed: Feb. 1, 1983

[30] Foreign Application Priority Data

Feb. 16, 1982 [JP] Japan ................. 57-23330

[51] Int. Cl.[4] .......................... G06F 9/18; G06F 9/38
[52] U.S. Cl. .................................... 364/200; 364/134
[58] Field of Search ... 364/200 MS File, 900 MS File, 364/134, 141

[56] References Cited

U.S. PATENT DOCUMENTS

| 3,896,418 | 7/1975 | Brown | 364/200 |
|---|---|---|---|
| 4,073,005 | 2/1978 | Parkin | 364/200 |
| 4,214,305 | 7/1980 | Tokita et al. | 364/200 |
| 4,268,904 | 5/1981 | Suzuki et al. | 364/200 |
| 4,308,580 | 12/1981 | Ohlaki | 364/200 |
| 4,313,161 | 1/1982 | Hardin et al. | 364/200 |
| 4,422,142 | 12/1983 | Inaba et al | 364/200 |

FOREIGN PATENT DOCUMENTS 56-105521  8/1981  Japan .

Primary Examiner—Gareth D. Shaw
Assistant Examiner—Daniel K. Dorsey
Attorney, Agent, or Firm—Oblon, Fisher, Spivak, McClelland & Maier

[57] ABSTRACT

A multiprocessor system includes a plurality of processors which are respectively connected to a memory device and each of which produces a first control signal when executing a test-and-set instruction and a second control signal after executing a sequence of queuing steps. The multiprocessor system further has flip-flop circuits each of which is set in response to the first control signal from the corresponding one of the processors and which are commonly reset in response to a secnd control signal from any one of the processors. The processors are prevented from executing the test-and-set instruction while the corresponding one of the flip-flop circuits is set.

4 Claims, 6 Drawing Figures

MULTIPROCESSOR SYSTEM HAVING MUTUAL EXCLUSION CONTROL FUNCTION

BACKGROUND OF THE INVENTION

The present invention relates to a multiprocessor system having a mutual exclusion control function.

With recent development in LSI technology, it is proposed to construct a multiprocessor system of highly enhanced performance. A multiprocessor system can be constructed by a plurality of processors each having a different function such as general arithmetic operation function or an input/output data processing function. The kinds and the number of processors constituting a multiprocessor system are increasing in order to improve the data processing performance of the system. Each processor must have a mutual exclusion control function for performing operation correctly. A processor having a mutual exclusion control function in a multiprocessor system can execute a sequence of operation steps without being interfered by any other processors.

FIG. 1 shows a multiprocessor system having processors 1 and 2 which commonly use a memory device 3. Assume that the processor 1 transfers data to the processor 2 through a queue or queuing area 4 in the memory device 3. In order to inform the processor 2 of the number of data transferred to the memory device 3, the processor 1 increases the content of a specific memory area 5 in the memory device 3 by one count every time it transfers data to the queuing area 4. The processor 2 detects the number of data transferred by the processor 1 to the queuing area 4 by reading the content of the specific memory area 5. The processor 2 decreases the content of the specific memory area 5 by one count every time it fetches data stored in the queuing area 4 thereinto. As a result, the content stored in the specific memory area 5 indicates the number of data which has been transferred by the processor 1 but which has not been fetched into the processor 2.

A series of steps to be described below must be executed to allow the processor 1 to increment the content of the specific memory area 5 by "1".

STEP 1: To read out the content of the specific memory area 5

STEP 2: To add "1" to the content read out from the specific memory area 5

STEP 3: To write the sum or addition result obtained in STEP 2 in the specific memory area 5.

On the other hand, a series of steps to be described below must be executed to allow the processor 2 to decrement the content of the specific memory area 5 by "1".

STEP 4: To read out the content of the specific memory area 5

STEP 5: To subtract "1" from the content read out from the specific memory area 5

STEP 6: To write the difference or subtraction result obtained in STEP 5 in the specific memory area 5.

A case will now be described where the processors 1 and 2 simultaneously start executing series of steps described above. If the processor 2 starts executing STEP 4 immediately before the processor 1 executes STEP 3 after having completed STEPs 1 and 2, the content written into the specific memory area 5 after STEP 6 is completed is equal to the value obtained by subtracting "1" from the content stored in the specific memory area 5 before STEP 1. On the other hand, if the processor 1 starts executing STEP 1 immediately before the processor 2 executes STEP 6 after having completed STEPs 4 and 5, the content written into the specific memory area 5 after STEP 3 is completed is equal to the value obtained by adding "1" to the content stored in the specific memory area 5 before STEP 4. In this manner, if the processors 1 and 2 execute the series of STEPs 1 to 3 and the series of STEPs 4 to 6 almost simultaneously, the content stored in the specific memory area 5 after those series of steps are completed differs from that before they are executed. Since, in this case, the processor 1 adds "1" to the content of the specific memory area 5 and the processor 2 substracts "1" from the contents of the specific memory 5, the content stored in the specific memory area 5 after the series of steps are completed should be equal to that before the series of steps are started. Such an error is caused since neither of the processors 1 and 2 can execute the series of steps exclusively.

In view of this problem, it is conventionally proposed to realize a mutual exclusion control function by allowing a plurality of processors 6-1 to 6-N commonly connected to the memory device 3, as shown in FIG. 2, to execute a test-and-set instruction. The test-and-set instruction allows exclusive execution of a step to read out the content of a flag memory area 7 in the memory device 3 and a step to write specific data (e.g., data "1") into the flag memory area 7.

When a processor executes a queuing operation by using the test-and-set instruction, it first executes the test-and-set instruction for the flag memory area 7 in the memory device 3. If the processor detects that data "1" is set in the flag memory area 7, it waits until the content of the memory flag area becomes "0". When the processor detects that data "0" is set in the flag memory area 7, it executes a sequence of the queuing steps. Simultaneously, it keeps the content of the flag memory area 7 set to "1" during the period of the execution of the queuing operation in order to prevent another processor from carrying out a queuing operation. When the queuing operation is completed, the processor sets the content of the flag memory area 7 to "0". This enables another queuing operation to follow.

However, in a multiprocessor system shown in FIG. 2, since the flag memory area 7 is provided in the memory device 3, the memory device 3 must be accessed in order for the processor to check the content of the flag memory area 7. Especially when the content of the flag memory area 7 is "1", one or more processors which want to execute the subsequent queuing operation access the memory device 3 repeatedly until the content of the flag memory area 7 is set to "0". This degrades the performance of the multiprocessor system extremely.

In order to reduce the frequency of access to the memory device 3, the use of a mutual exclusion control device 9 as shown in FIG. 3 is proposed. The mutual exclusion control device 9 is provided separately from the memory device 3 and consists of, for example, a group of registers for storing flags. By utilizing the mutual exclusion control device 9, the memory device 3 need not be accessed every time the content of the flag is checked. However, if the mutual exclusion control device 9 operates erroneously, it may adversely affect the operation of the multiprocessor system. For example, when a flag of the mutual exclusion control device 9 is reset by a noise while the processor 6-1 is executing the queuing operation, one or more of the other processors may start executing another queuing operation. In addition, if data "1" is set in the flag by a noise before any one of processors 6-1 to 6-N executes the test-and-set instruction for the flag, queuing operations by the processors are prohibited eternally. In order to solve this problem, the mutual exclusion control device 9 must operate with high reliability. This results in higher cost of the mutual exclusion control device. Furthermore, the mutual exclusion control device must have extra connecting ports for allowing more processors to be connected. However, since it is practically impossible to increase the number of processors exceeding the number of the connecting ports, the number of processors in a multiprocessor system is limited.

SUMMARY OF THE INVENTION

It is, therefore, an object of the present invention to provide a multiprocessor system which may realize a mutual exclusion control function with less overhead using hardware of simple configuration, and which may not be adversely affected by malfunction of the hardware.

According to an aspect of the present invention, a multiprocessor system is provided which has a plurality of processing means which are commonly connected to a memory device, and each of which generates a first signal when executing a test-and-set instruction for the memory device and a second signal after completing a series of operation steps; and a plurality of state signal generating circuits which are respectively connected to said plurality of processing means and, each of which generates a first state signal in response to said first signal from a corresponding one of said plurality of processing means and a second state signal in response to the second signal from any one of said plurality of processing means. Each of said plurality of processing means cannot execute the test-and-set instruction as long as the corresponding state signal generating circuit is generating the first state signal.

In the present invention, each processor does not execute the test-and-set instruction for the memory device as long as the corresponding state signal generating circuit is generating the first state signal. Therefore, the frequency of access to the memory device is reduced greatly. Furthermore, even if one state signal generating circuit generates the second state signal in response to a noise, the corresponding processor generates the first signal upon executing a test-and-set instruction for the memory device. Then, the corresponding state signal generating circuit generates the first state signal, and the processor is prevented from accessing the memory device repeatedly.

DETAILED DESCRIPTION OF THE PREFERRED EMBODIMENT

Figure 1:
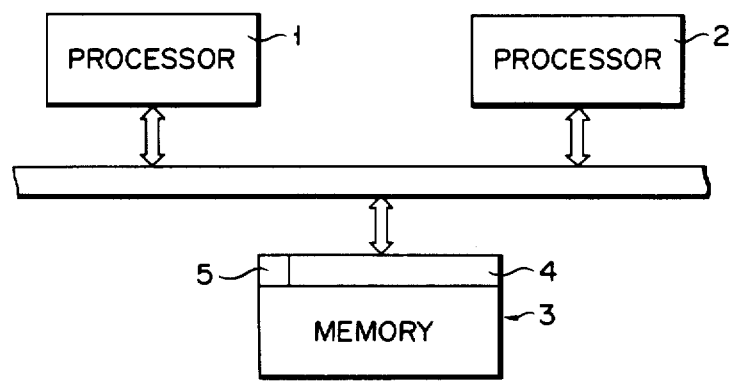
FIG. 1 shows a conventional multiprocessor system.
Figure 2:
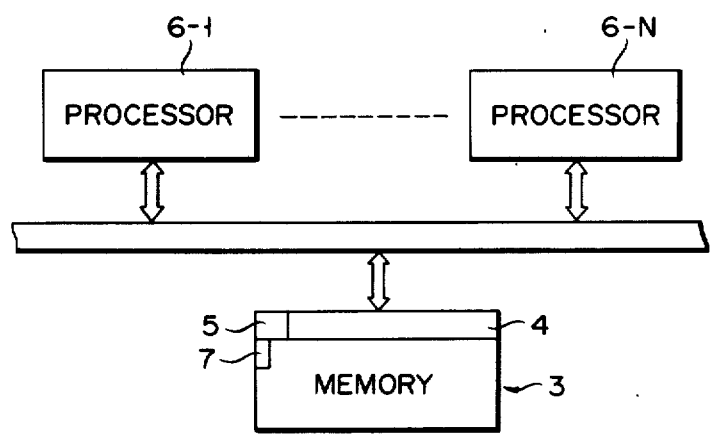
FIG. 2 is a block diagram of the conventional multiprocessor system having a test-and-set control function.
Figure 3:
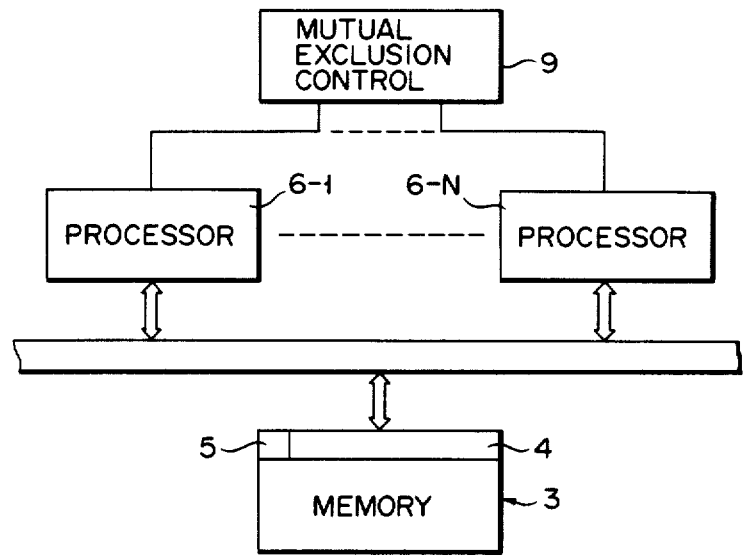
FIG. 3 is a block diagram of a conventional multiprocessor system having a mutual exclusion control function.
Figure 4:
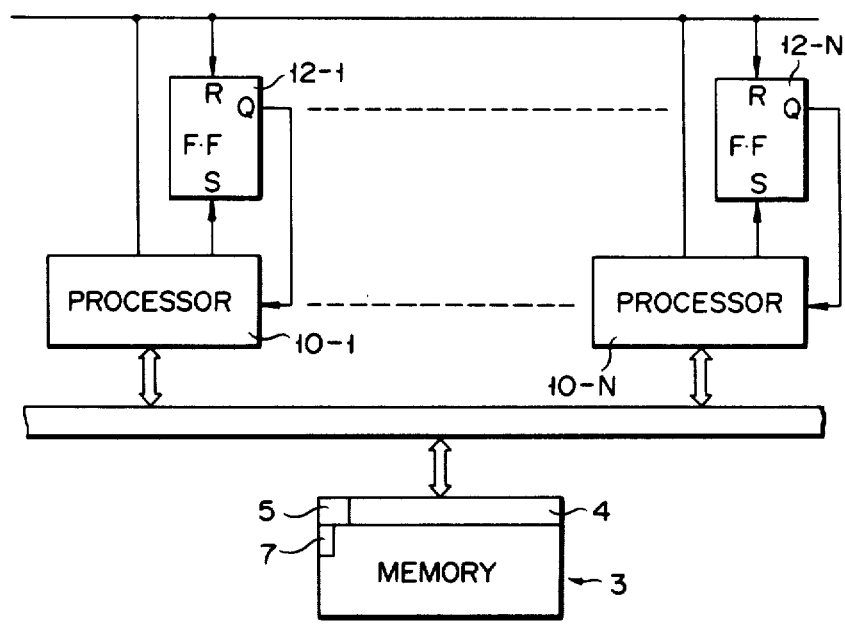
FIG. 4 is a block diagram of a multiprocessor system having the mutual exclusion control function according to an embodiment of the present invention.

FIG. 4 shows a multiprocessor system according to an embodiment of the present invention. The multiprocessor system includes a plurality of processors 10-1 to 10-N commonly connected to a memory device 3, and a plurality of flip-flop circuits 12-1 to 12-N, set input terminals of which are respectively connected to first control output terminals of the processors 10-1 to 10-N. Output terminals Q of the flip-flop circuits 12-1 to 12-N are respectively connected to control input terminals of the processors 10-1 to 10-N. Reset input terminals of the flip-flop circuits 12-1 to 12-N are commonly connected to one another and are also connected to second control output terminals of the processors 10-1 to 10-N.

Figure 5:
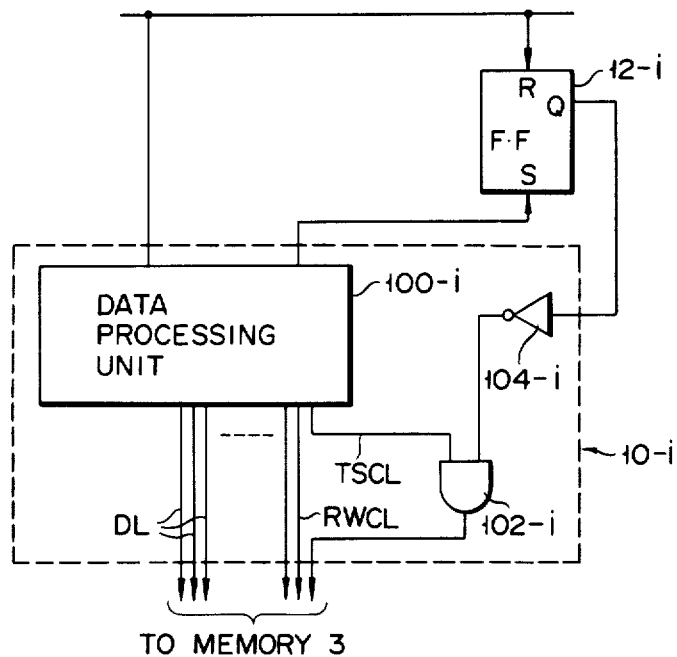
FIG. 5 shows one of plural sets of processors and flip-flop circuits of the multiprocessor system shown in FIG. 4.

The memory device 3 includes a queuing area 4, a specific memory area 5 and a flag memory area 7. After executing a test-and-set instruction for the memory device 3, each of the processors 10-1 to 10-N supplies a first control signal from the first control output terminal thereof to the set input terminal of a corresponding one of the flip-flop circuits 12-1 to 12-N for setting the same. When any one of the flip-flop circuits 12-1 to 12-N is set, a Q output signal from this flip-flop circuit is supplied to a corresponding one of the processors 10-1 to 10-N to prohibit the execution of the test-and-set instruction by the corresponding one of the processors 10-1 to 10-N. The prohibition of the test-and-set instruction can be easily attained by a known method. For example, in order to attain the prohibiting function, each of the processors 10-1 to 10-N is constructed as shown in FIG. 5. That is, a processor 10-i includes a data processing unit 100-i having a test-and-set control line TSCL, read/write control line RWCL and data lines DL connected to the memory 3, and an AND gate 102-i whose input terminals are connected to the output terminal Q of a flip-flop circuit 12-i through an inverter 104-i and to the test-and-set control line TSCL. When the flip-flop circuit 12-i is set to produce a high Q output signal, the AND gate 102-i is disabled to prevent the test-and-set instruction signal from being supplied to the memory 3.

A case will now be discussed where all the flip-flop circuits 12-1 to 12-N are reset and data "0" is set in the flag memory area 7 of the memory device 3. Assume that the processor 10-1 executes the test-and-set instruction for the flag memory area 7 of the memory device 3 under this condition. Then, data "1" is set in the flag memory area 7 of the memory device 3 and the processor 10-1 produces the first control signal from its first control output terminal so as to set the flip-flop circuit 12-1. Thereafter, the processor 10-1 executes the queuing operation. Even if another processor, for example, the processor 10-N executes the test-and-set instruction for the flag memory area 7 of the memory device 3 while the processor 10-1 executes the queuing operation, the execution of the queuing operation by the processor 10-N will be prevented since data "1" is set in the flag memory area 7. In this case, after executing the test-and-set instruction, the processor 10-N produces the first control signal from the first control terminal thereof so as to set the flip-flop circuit 12-N. This allows the flip-flop circuit 12-N to generate the Q output signal of high level, thereby preventing the processor 10-N from executing a successive test-and-set instruction for the flag memory area 7 of the memory device 3. In this manner, during the period in which the processor 10-1 executes the test-and-set instruction and then the queuing operation, each of other processors can execute the test-and-set instruction only once. Note that any processor cannot execute the test-and-set instruction more than once. When data "1" is set in the flag memory area 7, a processor in the standby mode is prevented from executing the test-and-set instruction repeatedly and does not access the memory device 3 repeatedly. Furthermore, when the flip-flop circuit 12-N, for example, is reset by a noise or the like under this condition, the processor 10-N is allowed to execute the test-and-set instruction for the flag memory area 7 of the memory device 3. However, the flip-flop circuit 12-N is set after executing the test-and-set instruction once and the processor 10-N is then prevented from executing another test-and-set instruction.

After the processor 10-1 completes the queuing operation, it produces a second control signal from its second output terminal so as to reset all of the flip-flop circuits 12-1 to 12-N. Simultaneously, the processor 10-1 sets data "0" in the flag memory area 7 so as to allow one of the processors 10-1 to 10-N to execute a subsequent test-and-set instruction for executing the queuing operation.

Figure 6:
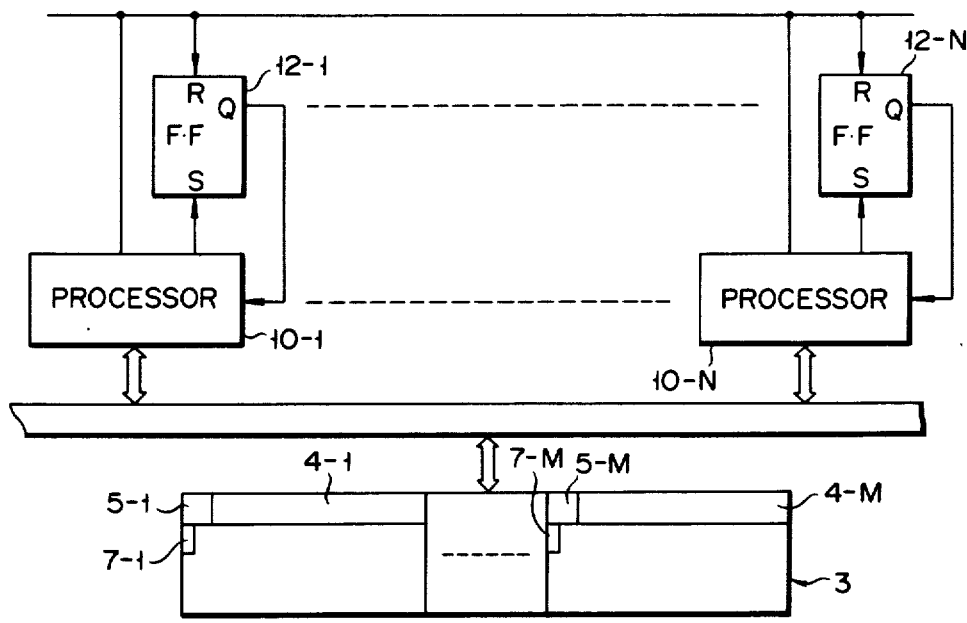
FIG. 6 is a block diagram of the multiprocessor system shown in FIG. 4 and a memory device having a plurality of memory areas for storing test-and-set instruction data.

FIG. 6 shows a multiprocessor system of a similar configuration to that shown in FIG. 4, in which each processor commonly uses a memory device 3 including a plurality of queuing areas 4-1 to 4-M, a plurality of specific memory areas 5-1 to 5-M, and a plurality of flag memory areas 7-1 to 7-M.

With reference to a multiprocessor system shown in FIG. 6, assume that the processors 10-1 and 10-N execute the test-and-set instructions for the flag memory areas 7-1 and 7-M in the memory device 3 so as to set data "1" in the flag memory areas 7-1 and 7-M, respectively, and then start executing the queuing operation. If other processors execute the test-and-set instruction for one of the flag memory areas 7-1 and 7-M, the corresponding flip-flop circuits are set and the processors will be in the standby mode. When the processor 10-N, for example, completes executing the queuing operation thereafter, it sets data "0" in the flag memory area 7-M and resets all the flip-flop circuits 12-1 to 12-N. Processors can execute the test-and-set instruction for one of the flag memory areas 7-1 to 7-M again. If, under this condition, one of the processors executes the test-and-set instruction for the flag memory area 7-M, for example, the processor detects that data "0" is stored in the flag memory area 7-M and starts the queuing operation. However, the processor which has executed the test-and-set instruction for the flag memory area 7-1 detects that data "1" is stored in this flag memory area 7-1 and then is set in the standby mode again.

In this manner, even if a multiprocessor system according to the present invention is used for the memory device 3 including a plurality of flag memory areas 7-1 to 7-M, it can operate efficiently.

Although the present invention has been described with reference to its particular embodiment, it is to be understood that the invention is not limited to this embodiment. For example, the flip-flop circuits 12-1 to 12-N can be replaced with switching circuits whose conduction states are controlled in response to the first and second control signals from the processors 10-1 to 10-N.

Further, the inverter 104-$i$ can be omitted by using a $\overline{Q}$ output signal instead of Q output signal from the flip-flop circuit 12-$i$ or by connecting the first and second control output terminals of the processor 10-$i$ to the reset and set input terminals of the flip-flop circuit 12-$i$, respectively.

What is claimed is:

1. A multiprocessor system comprising:
   common memory means having at least one memory area to store a flag of the test-and-set instruction;
   a plurality of data processing means connected to said common memory means to effect data transfer with respect to said common memory means, each of said data processing means producing a first signal upon having executed the test-and-set instruction for said memory means to check whether, in a first state, the flag of the test-and-set instruction is set in said memory area or not, setting the flag to the first state and then starting a sequence of data processing operations when it is detected that the flag is set in a second state; and each of said data processing means setting the flag to the second state and producing a second signal after having executed the sequence of data processing operations; and
   a plurality of state signals generating means respectively connected to said plurality of data processing means, said plurality of said data signal generating means being the same in number as said plurality of data processing means, each of said plurality of state signal generating means producing an inhibit signal to a corresponding one of said plurality of data processing means in response to the first signal from said corresponding data processing means from re-execution of the test-and-set instruction, and terminating generation of the inhibit signal in response to the second signal from any one of said data processing means, thereby permitting said corresponding data processing means to execute the test-and-set instruction.

2. A multiprocessor system according to claim 1, wherein each of said plurality of state signal generating means comprises a flip-flop circuit, a first input terminal of which is connected to receive a first signal from said corresponding one of said plurality of data processing means, and a second input terminal of which is connected to receive any one of second signals from said plurality of data processing means, the set and reset states of each of said flip-flop circuits being controlled in accordance with the first and second signals.

3. A multiprocessor system according to claim 2, wherein said first and second input terminals of said flip-flop circuits are set and reset input terminals, respectively.

4. A multiprocessor system according to claim 1, wherein each of said plurality of state signal generating means comprises a flip-flop circuit which is set in a first state in response to the first signal from said corresponding one of said plurality of data processing means and is set in a second state in response to the second signal from any one of said plurality of data processing means.

* * * * *